(12) United States Patent
Zagranski

(10) Patent No.: US 7,376,504 B2
(45) Date of Patent: May 20, 2008

(54) METHOD OF ENGINE SURGE DISCRIMINATION

(75) Inventor: Raymond D. Zagranski, Somers, CT (US)

(73) Assignee: Goodrich Pump & Engine Control Systems, Inc., West Hartford, CT (US)

( * ) Notice: Subject to any disclaimer, the term of this patent is extended or adjusted under 35 U.S.C. 154(b) by 0 days.

(21) Appl. No.: 11/001,247

(22) Filed: Dec. 1, 2004

(65) Prior Publication Data

US 2008/0027617 A1 Jan. 31, 2008

Related U.S. Application Data

(63) Continuation-in-part of application No. 10/194,811, filed on Jul. 12, 2002, now abandoned.

(60) Provisional application No. 60/335,498, filed on Nov. 15, 2001.

(51) Int. Cl.
*G01F 19/00* (2006.01)

(52) U.S. Cl. .................................................. 701/100

(58) Field of Classification Search .......... 701/99–100; 184/6.11; 60/233, 239; 700/287, 290
See application file for complete search history.

(56) References Cited

U.S. PATENT DOCUMENTS

| 3,867,717 | A | | 2/1975 | Moehring et al. |
| 4,490,791 | A | * | 12/1984 | Morrison .................... 701/100 |
| 4,594,051 | A | * | 6/1986 | Gaston ........................ 415/48 |
| 4,603,546 | A | | 8/1986 | Collins |
| 4,622,808 | A | | 11/1986 | Sheppard |
| 4,724,813 | A | * | 2/1988 | Cinpinski ................... 123/436 |
| 5,195,875 | A | * | 3/1993 | Gaston ....................... 417/282 |
| 5,726,891 | A | * | 3/1998 | Sisson et al. ............... 701/100 |
| 5,913,248 | A | * | 6/1999 | Harada et al. ........... 73/861.47 |
| 6,141,951 | A | | 11/2000 | Krukoski et al. |
| 6,408,624 | B1 | * | 6/2002 | Books et al. ................. 60/601 |

(Continued)

FOREIGN PATENT DOCUMENTS

EP 0 980 980 A2 2/2000

OTHER PUBLICATIONS

European Search Report dated Oct. 21, 2003.

*Primary Examiner*—Yonel Beaulieu
(74) *Attorney, Agent, or Firm*—Scott D. Wofsy; David J. Silvia; Edwards Angell Palmer & Dodge LLP

(57) ABSTRACT

A method from discriminating between spurious and genuine surges in a gas turbine engine is provided which includes the steps of receiving an engine speed signal over a global engine surge investigation region that includes a plurality of operating regions (e.g. speed bands) in which engine surges can occur, identifying a specific operating region in which an engine surge event occurs, incrementing a surge counter corresponding to the operating region in which the engine surge event occurred, identifying the operating regions in which no engine surge event occurred, decrementing a surge counter corresponding to each operating region in which no engine surge event occurred; enabling a surge avoidance signal when the magnitude of the surge counter for a particular operating region has reached a predetermined value; and adapting an engine acceleration schedule in the operating region corresponds to the surge avoidance signal.

23 Claims, 1 Drawing Sheet

U.S. PATENT DOCUMENTS

| | | | |
|---|---|---|---|
| 6,438,484 B1 * | 8/2002 | Andrew et al. | 701/100 |
| 6,513,333 B2 * | 2/2003 | Sugitani | 60/773 |
| 6,823,254 B2 * | 11/2004 | Faymon et al. | 701/100 |
| 7,089,738 B1 * | 8/2006 | Boewe et al. | 60/605.2 |
| 7,237,382 B2 * | 7/2007 | Muramatsu et al. | 60/773 |

* cited by examiner

METHOD OF ENGINE SURGE DISCRIMINATION

CROSS-REFERENCE TO RELATED APPLICATIONS

The subject application is a continuation-in-part of U.S. patent application Ser. No. 10/194,811, filed on Jul. 12, 2002, now ABANDONED, claiming the benefit of priority to U.S. Provisional Patent Application Ser. No. 60/335,498, which was filed on Nov. 15, 2001, the disclosures of each are herein incorporated by reference in their entirety.

GOVERNMENT RIGHTS STATEMENT

The U.S. Government has a paid-up license in this invention and the right in limited circumstances to require the patent owner to license others on reasonable terms as provided for by the terms of DAAH10-99-2-0005, awarded by the U.S. Department of the Army.

BACKGROUND OF THE INVENTION

1. Field of the Invention

The subject invention relates to a control system for use with aircraft gas turbine engines, and more particularly to, a method of discriminating between spurious engine surges caused by, for example, disturbances to the inlet gas stream and genuine engine surges caused by, for example, the deterioration of the core engine or the malfunction of a critical engine component.

2. Background of the Related Art

The occurrence of a surge event in a gas turbine engine is often a precursor to a stall condition. Several techniques have been developed for detecting whether a surge event has occurred. A first technique compares engine control parameters with actual engine parameters. By example, the existence of a sustained difference between the demanded rate of change of engine speed and the actual rate of change of engine speed may indicate a surge condition. Another technique uses an engine signature to detect an engine surge, and relies primarily on a measurement of combustor burner pressure. In particular, this technique relies on sensing a transient spike in combustor burner pressure.

State-of-the-art adaptive digital control systems for helicopter gas turbine engines are configured to modify or adapt the baseline engine acceleration schedules following an engine surge event in an effort to compensate for and avoid future engine surges. However, these modifications are not permanently stored in computer memory because the surge event may have been spurious rather than genuine. If the surge event was spurious, permanently modifying the acceleration schedule would result in an reduction in engine performance over the present operating period, but more importantly would unnecessarily degrade engine performance during subsequent operating periods until maintenance is performed on the engine.

Therefore, in prior art control systems, which are not capable of making distinctions between spurious and true surge events, the adaptation of the acceleration schedule is stored in volatile computer memory (RAM) and the schedule is returned to the baseline values prior to the beginning of the next operating period.

Spurious engine surges can result from the ingestion of munitions gases, rocket exhaust gases or engine exhaust gases causing a distortion in the inlet air flow to the engine. Generally, spurious surge events are not repetitive and occur randomly. Genuine engine surges, on the other hand, often result from the deterioration of the core engine or malfunction of an engine component such as an inlet guide vane or bleed valve, and require repair or removal of the engine. Moreover, genuine surge events typically repeat within specific operating ranges, such as gas generator speed.

Often, after an initial engine surge event and subsequent modification of the baseline acceleration schedules of the engine, the remainder of the flight is without incident. However, since the acceleration schedule modifications are not stored in the permanent computer memory, if the initial surge event was indeed genuine, the engine will surge again on subsequent flights, and the engine performance will remain deteriorated. Under such circumstances, the engine would be removed from service.

U.S. Pat. No. 5,726,891 to Sisson et al. discloses a method of, and a system for, detecting an occurrence of a surge in a gas turbine engine. The method illustrated in Sisson includes steps, executed during consecutively occurring time periods, of: obtaining filtered derivatives of first and second engine operating characteristics; comparing the filtered derivatives of the first and the second engine operating characteristics to first and second threshold values, respectively; and incrementing a count only if both of the filtered derivatives exceed their respective threshold values. Otherwise, a next step decrements the count if one or both of the filtered derivatives do not exceed their respective threshold values. The method further includes a step of indicating a surge condition only if the count is equal to a predetermined value that is greater than unity. In a presently preferred embodiment of this invention the engine is a turbofan engine, the first engine operating characteristic is fan speed, and the second engine operating characteristic is exhaust gas temperature.

Although the Sisson et al method attempts to reduce the number of "false alarms" generated by transient conditions, it does so by evaluating the derivatives of two operating parameters over consecutively occurring time periods. A disadvantage of the Sisson et al. surge detection method is that it does not provide a method for distinguishing a spurious surge, which is a surge nonetheless, from a genuine surge. The Sisson et al. disclosure does not recognize that most genuine surge events often repeat at distinct operating regions and most spurious surge events occur randomly throughout the operating range of the engine.

It would be beneficial therefore, to provide a method of discriminating between spurious engine surges caused by disturbances to the inlet gas stream and genuine or true engine surges caused by the deterioration of the core engine or malfunction of critical engine components. Such a method would allow surge avoidance modifications to be permanently stored in non-volatile computer memory for subsequent application. The engine would remain in service until the next scheduled maintenance stop, thereby minimizing aircraft downtime.

SUMMARY OF THE INVENTION

The subject invention is directed to a new and useful method of discriminating between spurious and genuine surges in a gas turbine engine of a helicopter. It is noted that those skilled in the art will readily appreciate that the abbreviation NGC, which is used throughout the specification, refers to the "corrected gas generator speed" or the gas generator speed corrected to account for variations in engine inlet air temperature The method includes the steps of receiving a turbine speed signal over a global engine surge investigation region (typically from idle to maximum turbine speed) having a plurality of operating regions in which engine surge events can occur, identifying a specific operating region in which an engine surge event occurs, and incrementing a surge counter corresponding to the specific operating region in which the engine surge event occurred.

The method further includes the steps of identifying the specific operating regions of the global engine surge investigation region (i.e., idle to max speed) in which no engine surge event occurred, and decrementing a surge counter corresponding to each specific operating region in which no engine surge event occurred. The method also includes enabling a surge avoidance flag when a surge counter corresponding to one of the operating regions reaches a predetermined value, and the step of modifying a baseline engine acceleration schedule in response to an engine surge avoidance flag.

Preferably, the step of incrementing a surge counter corresponding to a specific operating region in which the engine surge event occurred includes incrementing the particular surge counter by a magnitude of two. Preferably, the step of decrementing a surge counter corresponding to each specific operating region in which no engine surge event occurred includes decrementing the particular surge counter by a magnitude of one.

Preferably, the step of enabling a surge avoidance flag includes enabling a surge avoidance flag when the magnitude of a surge counter corresponding to one of the regions reaches a value that is greater than or equal to five. However, it is envisioned that this predetermined value may vary depending upon the engine application with which the subject methodology is employed or the operating environment in which the aircraft is engaged. Preferably, the method also includes the step of resetting each of the surge counters when power to an engine control unit goes to zero. Preferably, the method further includes the step of providing a global surge investigation region from idle to maximum turbine speed with five operating regions in which engine surge events can occur. It is envisioned however, that the number of operating regions in which surge events can occur can vary depending upon the engine application with which the subject methodology is employed or the operating environment in which the aircraft is engaged. In a preferred embodiment, the operating regions are speed regions or band. However, those skilled in the art would readily appreciate that other operating bands or regions can be defined which in combination extend over the global surge investigation region. For example, the operating regions can be related to speed, pressure or component orientation or configuration (e.g. inlet guide vane angle or bleed valve position).

These and other aspects of the method of the subject invention will become more readily apparent to those having ordinary skill in the art from the following detailed description of the invention taken in conjunction with the drawings described herein below.

BRIEF DESCRIPTION OF THE DRAWINGS

So that those having ordinary skill in the art to which the unique method of the subject invention appertains will more readily understand how to make and use the same, reference may be had to the drawings wherein.

Figure 1:
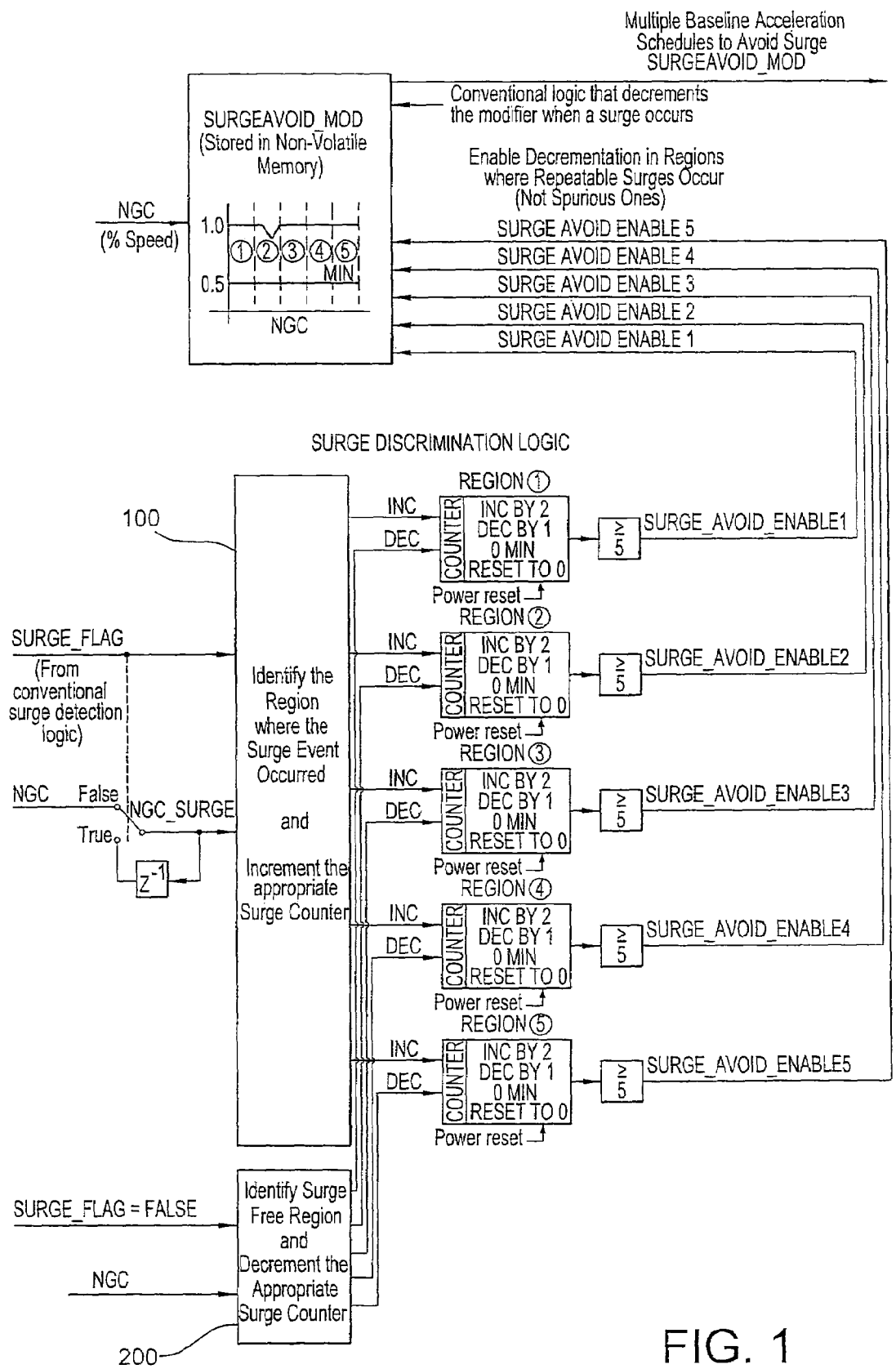
FIG. 1 is a schematic representation of the engine surge discrimination logic configured in accordance with a preferred embodiment of the subject invention which communicates with an engine speed sensor and baseline acceleration schedules which can be modified to avoid future engine surges.

Further features of the control logic of the subject invention will become more apparent from the detailed description of preferred embodiments of the invention that follows.

DETAILED DESCRIPTION OF PREFERRED EMBODIMENTS

Referring now to FIG. 1, there is disclosed a schematic diagram depicting the logic flow for discriminating between spurious and genuine surges in a gas turbine engine of a helicopter. Spurious engine surges can result from, for example, a distortion in the inlet air flow to the engine raised by the ingestion of munitions gases, rocket exhaust gases or engine exhaust gases. Genuine engine surges often result from the deterioration of the core engine or the malfunction of an engine component such as an inlet guide vane or bleed valve.

As illustrated in FIG. 1, the control logic utilizes input from, among other sources, an engine sensor in the form of a corrected gas generator speed (NGC) signal which is evaluated over a predefined investigation region (typically from idle to maximum turbine speed) period consisting of a plurality of operating regions in which engine surge events can occur. In accordance with the subject disclosure, there are five operating regions within the global predefined investigation region. It is envisioned however, that the extent of the global engine surge investigation region and the number of operating regions can vary depending upon the type of engine with which the subject control logic is employed and the operating environment of the helicopter with which the engine is associated. In the preferred embodiment described hereinbelow the operating regions are speed regions or speed bands.

When the engine is operating within the global predefined investigation region, the system evaluates the NGC speed signal received from an engine sensor to identify specific regions in which a surge event has occurred, as well as the surge-free regions in which no surge event has occurred. The goal of the methodology is to identify specific regions of the NGC speed signal in which repeatable engine surges occur, as it is these surge events that are likely to be genuine rather than spurious. Those skilled in the art would readily appreciate that although it is presently preferable that the predefined investigation region typically extends from idle to maximum turbine speed, a narrower investigation region can be established based on factors such as the operational characteristic of the engine.

The control logic includes a processing block 100 that is adapted and configured to identify regions of the NGC signal where surge events have occurred, and a processing block 200 that is adapted and configured to identify surge-free regions of the NGC signal. The NGC_SURGE signal received by processing block 100 results from a gate triggered by a SURGE_FLAG signal received from conventional surge detection logic. Those skilled in the art will readily appreciate that conventional surge logic merely identifies whether a surge has occurred and is not capable of distinguishing between spurious engine surges and genuine surges in the manner as described herein. Moreover, the present invention is not limited to one system and method for determining whether a surge, either spurious or genuine, has occurred. The present invention can used with any conventional or newly developed surge detection logic, such as that disclosed in U.S. Pat. No. 5,402,632 to Nobre et al, which is herein incorporated by reference in its entirety. More specifically, once the surge detection logic determines that a surge has occurred and a SURGE_FLAG signal is produced, the present invention functions to then determine whether the identified surge is spurious or genuine.

When the SURGE_FLAG signal triggers the gate to the TRUE position, the last value is held. In addition to the NGC signal, processing block 200 receives a signal indicating that the SURGE_FLAG is FALSE.

Five surge counters, one for each of the five operating or speed regions of the investigation period, are cooperatively associated with processing blocks 100 and 200. Processing block 100 is configured to increment a surge counter corresponding to a region in which a surge has occurred by a value of two, while processing block 200 is configured to decrement a surge counter corresponding to a surge-free region by a value of one.

In operation, the conventional surge logic determines that a surge event has occurred during the predefined investigation period. Processing block 100, which receives an input of the NGC speed signal determines in which speed region the surge occurred and increments the appropriate counter by two. In contrast, processing block 200, which also receives an input of the NGC speed signal determines which regions are surge free and decrements the counter in the corresponding surge-free regions. It should be noted that during a predefined investigation region, more the one surge can occur and therefore, more than one counter can be incremented.

When one of the five surge counters attains a value that is greater than or equal to five, a surge avoidance signal SURGE_AVOID_ENABLE is transmitted. This signal is then used to modify, in a particular operating region, the baseline engine fuel flow, inlet guide vane and/or bleed valve schedules. The surge avoidance modification SURGE_AVOID_MOD, for the specified operating region, is then retained in the non-volatile memory of an on-board computer for future reference and use.

It should be noted that in the presently disclosed embodiment, the system is configured to reset each of the five surge counters utilized with the control logic to zero when power to an engine control unit goes to zero. Additionally, the counters can not be decremented to a value less than zero.

In the example presented in FIG. 1, multiple surge events had occurred in speed region (2) during a previous investigation period (i.e., in a previous flight or earlier in the current flight). As a result, the SURGE-AVOID-MOD shows a decrement from its baseline value of 1.

Although the system and method of the subject invention has been described with respect to preferred embodiments, those skilled in the art will readily appreciate that changes and modifications may be made thereto without departing from the spirit and scope of the present invention as defined by the appended claims.

What is claimed is:

1. A method of discriminating between spurious and genuine surges in a gas turbine engine comprising the steps of:
    a) receiving an engine speed signal over a global engine surge investigation region having a plurality of operating regions in which engine surge events can occur;
    b) identifying an operating region of the global engine surge investigation region in which an engine surge event occurs;
    c) incrementing a surge counter corresponding to the specific operating region of the global engine surge investigation region in which the engine surge event occurred;
    d) identifying the specific operating regions of the global engine surge investigation region in which no engine surge event occurred;
    e) decrementing a surge counter corresponding to each specific operating region of the global engine surge investigation region in which no engine surge event occurred; and
    f) enabling a surge avoidance flag when a surge counter corresponding to one of the operating regions reaches a predetermined value.

2. A method according to claim 1, wherein the operating regions are speed bands.

3. A method according to claim 1, wherein the step of incrementing a surge counter corresponding to an operating region of the global engine surge investigation region in which the engine surge event occurred comprises incrementing said surge counter by a magnitude of two.

4. A method according to claim 1, wherein the step of decrementing a surge counter corresponding to each operating region of the global engine surge investigation region in which no engine surge event occurred comprises decrementing said surge counter by a magnitude of one.

5. A method according to claim 1, wherein the step of enabling a surge avoidance flag includes enabling a surge avoidance flag when the magnitude of a surge counter is at least equal to five.

6. A method according to claim 1, further comprising the step of resetting each of the surge counters when power to an engine control unit goes to zero.

7. A method according to claim 1, further comprising the step of providing a global surge investigation region with five operating regions in which engine surge events can occur.

8. A method according to claim 1, further comprising the step of modifying baseline engine control schedules in response to an engine surge avoidance flag.

9. A method according to claim 8, further comprising the step of storing a modification to baseline engine control schedules in non-volatile memory for subsequent application.

10. A method of discriminating between spurious and genuine surges in a gas turbine engine comprising the steps of:
    a) receiving an engine speed signal over a global engine surge investigation region having a plurality of operating regions in which engine surge events can occur;
    b) identifying a specific operating region of the global engine surge investigation region in which an engine surge event occurs;
    c) incrementing a surge counter corresponding to the specific operating region of the global engine surge investigation region in which the engine surge event occurred by a first magnitude;
    d) identifying the specific operating regions of the global engine surge investigation region in which no engine surge event occurred;
    e) decrementing a surge counter corresponding to each operating region of the global engine surge investigation region in which no engine surge event occurred by a second magnitude that is less than the first magnitude;
    f) enabling a surge avoidance flag when the magnitude of a surge counter corresponding to one of the operating regions reaches a predetermined value.

11. A method according to claim 10, wherein the step of incrementing a surge counter corresponding to an operating region of the global engine surge investigation region in which the engine surge event occurred comprises incrementing said surge counter by a magnitude of two.

12. A method according to claim 10, wherein the step of decrementing a surge counter corresponding to each operating region of the global engine surge investigation region in which no engine surge event occurred comprises decrementing said surge counter by a magnitude of one.

13. A method according to claim 10, wherein the step of enabling a surge avoidance flag includes enabling a surge avoidance flag when the magnitude of a surge counter has reached a value that is at least equal to five.

14. A method according to claim 10, further comprising the step of resetting each of the surge counters when power to an engine control unit goes to zero.

15. A method according to claim 10, further comprising the step of providing a global surge investigation region with five operating regions in which engine surge events can occur.

16. A method according to claim 10, further comprising the step of modifying baseline engine control schedules in response to an engine surge avoidance flag.

17. A method according to claim 16, further comprising the step of storing a modification to baseline engine control schedules in non-volatile memory for subsequent application.

18. A method of discriminating between spurious and genuine surges in a gas turbine engine comprising the steps of:
 a) providing a surge detection system for determining whether an engine surge event has occurred;
 b) receiving a surge flag signal from the surge detection system indicating that a surge event has occurred;
 c) receiving an engine speed signal over a global engine surge investigation region having a plurality of speed bands in which engine surge events can occur;
 d) identifying a specific speed band of the global engine surge investigation region in which an engine surge event occurred;
 e) incrementing a surge counter corresponding to the speed band of the global engine surge investigation region in which the engine surge event occurred by a magnitude of two;
 f) identifying the speed bands of the global engine surge investigation region in which no engine surge event occurred;
 g) decrementing a surge counter corresponding to each speed band of the global engine surge investigation region in which no engine surge event occurred by a magnitude of one; and
 h) enabling a surge avoidance signal when the magnitude of the surge counter corresponding to one of the speed bands has reached a predetermined value.

19. A method according to claim 18, wherein the step of enabling a surge avoidance signal includes enabling a surge avoidance signal when the magnitude of a surge counter has reached a value that is at least equal to five.

20. A method according to claim 18, further comprising the step of resetting each of the surge counters when power to an engine control unit goes to zero.

21. A method according to claim 18, further comprising the step of providing a global surge investigation region with five operating regions in which engine surge events can occur.

22. A method according to claim 18, further comprising the step of modifying baseline engine control schedules in response to an engine surge avoidance flag.

23. A method according to claim 22, further comprising the step of storing a modification to baseline engine control schedules in non-volatile memory for subsequent application.

* * * * *